3,402,348
REMOVAL OF THE EFFECT OF MICRO-PULSATION FIELD FROM MAGNETIC WELL LOGS
Gustave L. Hoehn, Jr., and William H. Ruehle, Dallas, Tex., assignors to Mobil Oil Corporation, a corporation of New York
Filed Feb. 15, 1965, Ser. No. 432,578
1 Claim. (Cl. 324—8)

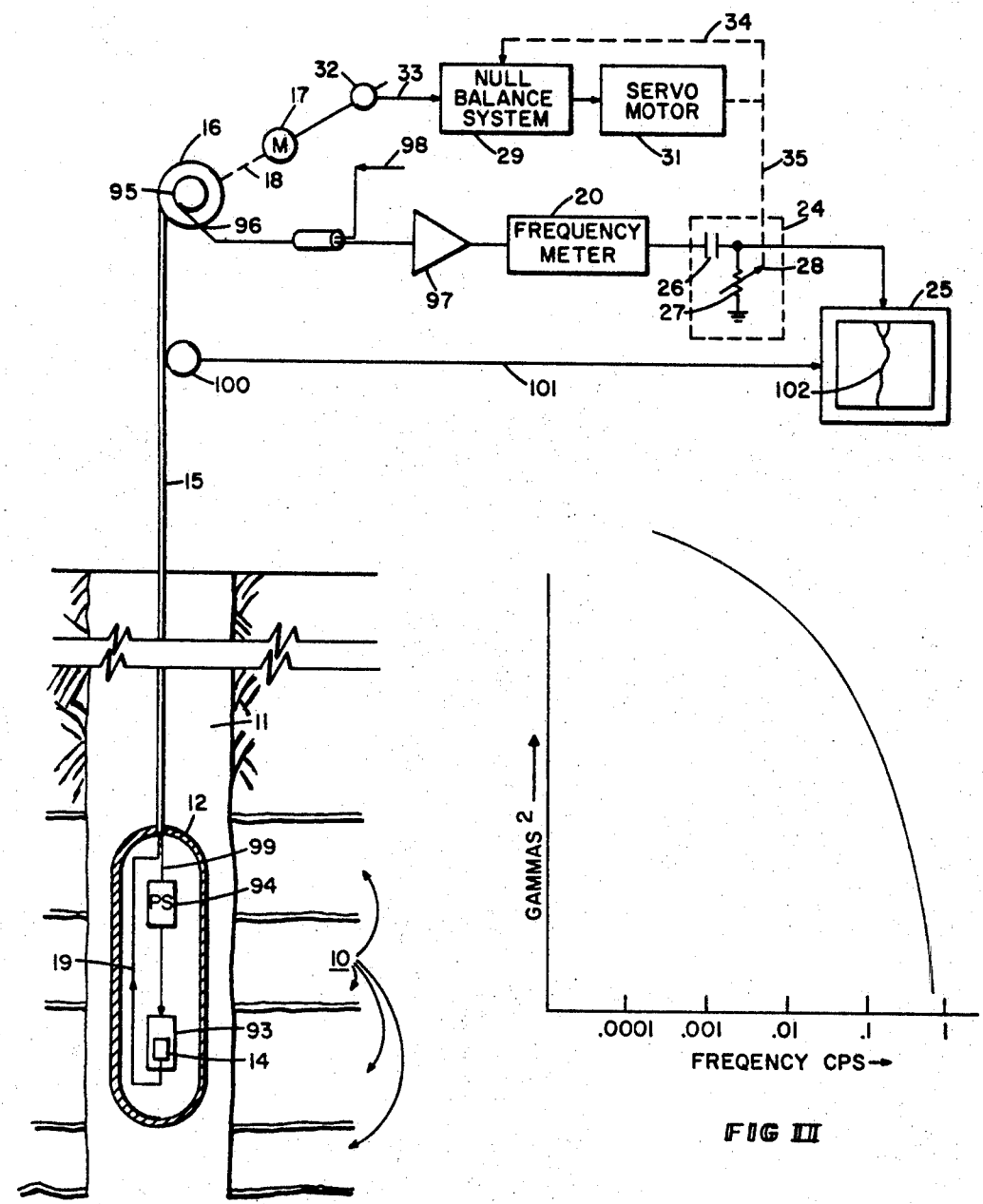

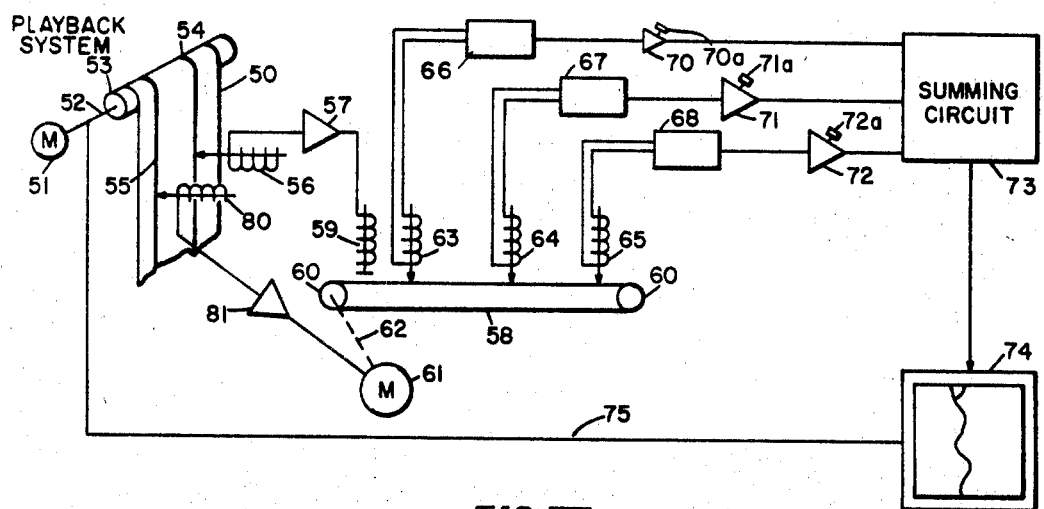
FIG III
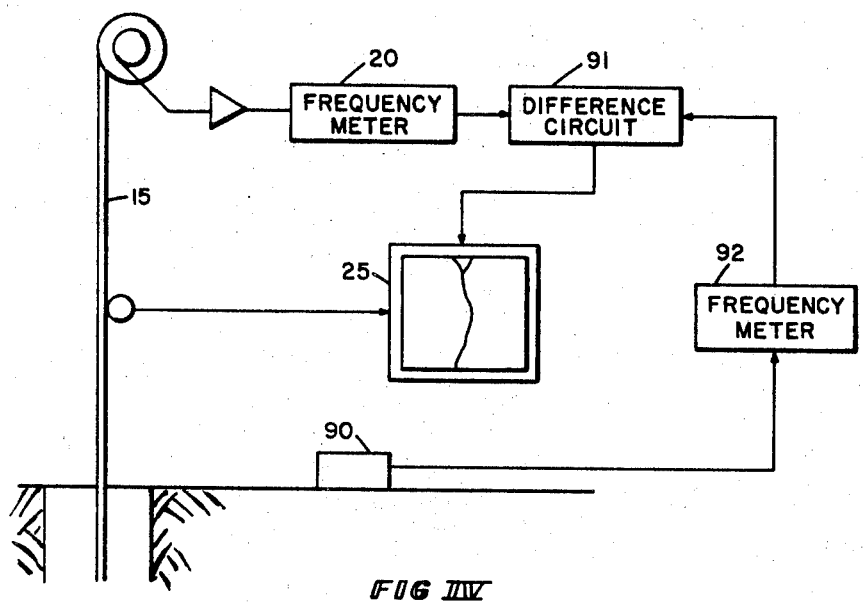
FIG IV
INVENTORS
GUSTAVE L. HOEHN, Jr.
WILLIAM H. RUEHLE
ATTORNEY

United States Patent Office 3,402,348
Patented Sept. 17, 1968

ABSTRACT OF THE DISCLOSURE

The specification discloses the production of well logs indicative of magnetic fields from the formations wherein there is reduced the effect of significant signal components of the low frequency micropulsation field. The effect of the micropulsation field may be reduced by filtering, either electric or time-domain, or by obtaining an independent measurement of the micropulsation field and subtracting this from the borehole logs obtained. In the embodiments wherein filtering operations are carried out, signal components below a cutoff frequency and within the range from zero to about one cycle per second are filtered from the borehole measurements obtained.

---

This invention relates to the measurement of magnetic fields from subsurface formations and more particularly to the production of a log representative of the magnetic fields from the formations traversed by a borehole wherein there is reduced the effect of the micropulsation field.

In geophysical exploration, it is desirable to measure magnetic fields from subsurface formations to obtain a measure of remanent magnetism or susceptibility. Such information is of importance, for example in the exploration of oil, in identifying the various subsurface formations traversed by a borehole.

In a borehole, the main contributions to the total magnetic field are the components due to the earth's field, the formation fields, and the time-varying magnetic field, commonly known as the micropulsation magnetic field. The earth's field is of large magnitude (of the order of 50,000 gammas); however, the variations in this field over distances of the order of borehole depth are small. Thus, in traversing a borehole the variations encountered in magnetic field intensity will be due primarily to variations in the formation field and the time-varying micropulsation field.

The formation fields generally have magnitudes extending to a maximum value of the order of 15 gammas. The time-varying micropulsation field, however, has peak-to-peak magnitudes of the order of 1 to 100 gammas at frequencies below one cycle per second. Thus, in many instances, the micropulsation field will mask or interfere with the measurement of the formation fields of interest.

In accordance with the present invention, the effect of the micropulsation field is reduced at least at a frequency level below about one cycle per second in order to provide a borehole log representative primarily of variations of the magnetic field from subsurface formations of interest. In carrying out the invention, the total magnetic field in a borehole is detected in order to obtain measurements at least of the formation fields of interest traversed by the borehole. A function is produced representative of the field detected in the borehole. From the function produced, there is removed signal components having a frequency at least below one cycle per second to reduce the effect of the micropulsation field on the measurements obtained.

In one embodiment, interfering signal components are removed by filtering. Preferably, a cutoff frequency is selected at a point below one cycle per second. This is desired in order to pass the fundamental frequency of the maximum layering thickness of interest which generally is below one cycle per second at conventional logging speeds. For example, at logging speeds of the order of thirty feet per minute, the fundamental frequency of ten-foot layerings is of the order of 0.05 cycle per second. In order to obtain a measure of the magnitude of the field from such formations rather than just boundary delineations, frequencies of the order of 0.05 per second and above should be included in the measurements. Due to the unique frequency spectrum of the micropulsation field, a cutoff frequency at about 0.05 cycle per second or slightly below will pass the frequency spectrum of interest and yet eliminate significant contributions from the micropulsation field.

In a further aspect of the present invention, the cutoff frequency employed is selected in direct dependence upon the logging speed. For example, at a logging speed of sixty feet per minute, the fundamental frequency of ten-foot layerings will be of the order of 0.1 cycle per second. Under these conditions, the cutoff frequency is extended to about 0.1 cycle per second, thus allowing a greater portion of the micropulsation field to be eliminated.

In accordance with another embodiment of the present invention, the effect of the micropulsation field is reduced by measuring independently the micropulsation field at or near the surface and away from the effect of the formation fields of interest. The micropulsation field independently measured then is compared with the field measured in the borehole to obtain a resultant measurement substantially free from the effect of the micropulsation field. This technique has particular applications, for example, in relatively shallow boreholes where no significant phase shift in the micropulsation field is expected in traveling from the surface to the lower limits of the borehole.

For further objects and advantages of the present invention and for a more complete understanding thereof, reference may now be had to the following detailed description taken in conjunction with the accompanying drawings wherein:

FIGURE 1 illustrates a borehole logging system for carrying out the present invention;

FIGURE 2 is a power spectrum of the micropulsation field;

FIGURE 3 illustrates a modified system for carrying out the present invention; and FIGURE 4 illustrates a further modification of the present invention.

Referring now to FIGURE 1, there will be described the borehole logging system for obtaining a log of the magnetic field from the formations, illustrated at 10 for example, and traversed by a borehole 11. The magnetic field of interest is that due to remanent magnetism or magnetic susceptibility. The borehole system comprises a logging unit 12 having a magnetometer which includes a sensing head 14. The borehole unit 12 is moved through the borehole by a cable 15 wound and unwound upon a drum 16 which in turn is driven by motor 17 and by way of mechanical connection 18. In the logging operations, the sensing head 14 produces a signal output which is representative of the variations of the magnetic field encountered in the borehole. In the embodiment disclosed, the sensing head 14 produces a signal having a frequency proportional to the magnetic field encountered. The signal output is amplified (by means not shown) and transmitted to the surface by way of cable conductor 19. At the surface, the sensing head output is applied to a frequency meter 20 which converts the signal frequency to an analog voltage having a magnitude proportional to the output frequency of the magnetometer and hence of the magnetic field. The output of the frequency meter is applied to a high pass filter 24 and then to a recorder 25. In carrying out the present invention, the filter 24 is adjusted to filter out signal components preferably below one cycle per second to reduce the effect of the micropulsation field.

Below about one cycle per second, significant micropulsation amplitude variations take place. Above this frequency, however, the amplitude variations are relatively insignificant. This can be understood by reference to FIGURE 2 which illustrates a power spectrum of the micropulsation field. As shown, the amplitude variations are very large at low frequencies but drop off very significantly at frequencies approaching one cycle per second.

In actual practice, it is desired to employ a cutoff frequency at a point below one cycle per second. This is desired in order to pass the fundamental frequency of the maximum layering thickness of interest which for most applications is below one cycle per second at conventional logging speeds. For example, in our operations we have found that the magnetic layering extends from the order of inches to about ten feet and generally not greater than twenty feet. As mentioned previously, for ten-foot layerings at a logging speed of thirty feet per minute, the fundamental layering frequency is of the order of 0.05 cycle per second. Passage of this frequency is desired in order to obtain good resolutions for layering up to ten feet in thickness. Rejection of frequency components below this limit, however, eliminates significant contributions from the micropulsation field as is evident from FIGURE 2.

In carrying out the present invention, the cutoff frequency employed preferably is selected within practical logging speed limits in direct dependence upon the logging speed. This allows us to obtain better results at increased logging speeds.

More particularly, for a given layering thickness, the fundamental frequency varies directly with the logging speed as illustrated by the following Table I.

TABLE I

| Logging speeds, ft. per min.: | Fundamental layering frequency for 10 ft. layerings |
|---|---|
| 12 | 0.02 |
| 30 | 0.05 |
| 60 | 0.1 |
| 300 | 0.5 |

As the speed is increased, the fundamental frequency increases. Thus, at increased speeds the cutoff frequency may be increased thereby eliminating a greater portion of the micropulsation field.

In each of the examples given in Table I, the cutoff frequency employed is slightly below the fundamental frequency shown. By appropriate filtering at each speed, the very large micropulsation field variations found at the very low frequencies will be eliminated while at the same time the fundamental layering frequency of layerings up to ten feet thick will be passed.

The relationship between the cutoff frequency and the logging speed may be expressed in the following manner:

$$f_c = S/K \quad (1)$$

wherein:
$f_c$ = the frequency value in cycles per second below which substantially all frequency components are filtered out;
$S$ = the speed of logging in feet per minute;
$K$ = a proportionality constant dependent upon the thickest layering of interest and the logging speed.

The value of $K$ may be found by dividing the logging speed by the fundamental layering frequency obtained when logging the maximum layering thickness of interest at the selected logging speed. For example, for layerings up to ten feet thick and at a logging speed of sixty feet per minute, $K$ will be equal to 600. In actual practice, $K$ may be slightly greater than 600, for example 605, in order to insure that the fundamental frequency of ten-foot layerings is passed. For layering thickness up to twenty feet and at a logging speed of sixty feet per minute $K$ will have a value slightly greater than 1200, for example 1205.

A more detailed description of the present invention will be given now. The filter 24 illustrated in FIGURE 1 is an electrical filter comprising a capacitor 26 and a variable resistor 27. Selection of the desired cutoff frequency may be carried out by varying the position of the arm 28 to vary the time constant of the circuit. Adjustment may be carried out automatically by employing a servosystem which may include a null-balance system 29 and a servomotor 31 for controlling the position of arm 28 to vary the time constant of the filter 24 in accordance with logging speed. A tachometer generator, illustrated at 32, is driven by the shaft of motor 17 to produce a voltage proportional to the speed of the motor 17 and hence the logging speed. The voltage is applied by way of conductor 33 to the null-balance system 30 to convert the electrical signal into mechanical motion for adjustment of the position of arm 28. More particularly, the input to the null-balance system from tachometer generator 32 may be considered an error signal which is sensed in a manner well known to those skilled in the art. A balance signal is generated which cancels the error signal through means including the motor 31 and mechanical coupling 34 controlled by the shaft of motor 31. The shaft of the motor 31 also controls the position of arm 28 by mechanical coupling illustrated at 35.

In the embodiment of FIGURE 1, the filtering is carried out during logging with an electrical filter coupled to the output of the frequency meter 20. It is to be understood, however, that the magnetic field as measured in the borehole may be recorded, for example, on magnetic tape, and the effect of the micropulsation field filtered out during playback. The filter employed in the playback system may be a time-domain, time-variable filter as disclosed in copending application Ser. No. 316,593, entitled Geophysical Data Processing, filed Oct. 16, 1963, by William H. Ruehle, and assigned to the same assignee as the present application.

Referring to FIGURE 3, a suitable playback filter system now will be described. The playback system now comprises a magnetic tape 50 driven at a constant speed by motor 51, mechanical connection 52, and reel 53. On the tape 50, there has been recorded, during logging, the borehole magnetic field signal 54 and a timing signal 55. The magnetic field signal 54 is sensed by a pickup head 56, coupled to suitable instrumentation including amplifier 57 and recorded on magnetic tape 58 by recording head 59. Tape 58 is supported on reels 60, one of which is driven at a variable speed by motor 61 through mechanical connection 62. The signal recorded on tape 58 sequentially is applied to a plurality of pickup heads 63–65, comprising elements of the time-variable, time-domain filter. Only three pickup heads have been illustrated for simplicity; however, it is to be understood that many more may be employed, depending upon the desired response characteristic and spacing of the pickup heads. Each of the pickup heads 63–65 has associated with it a polarity-determining means 66, 67, and 68, and a weighting means illustrated as amplifiers 70, 71, and 72, the gain of each of which is adjusted through means represented by control knobs 70A, 71A, and 72A. As described in the above-identified application, the outputs from the pickup heads are adjusted as by manipulation of the polarity-determining devices 66–68 and the gain of amplifiers 70–72 to produce the desired filter response. The outputs from all of the pickup heads and their associated polarity and gain-adjusting means are applied to a summing circuit 73. The output of the summing circuit, the filtered log, in turn is recorded by a suitable recorder 74, the chart of which is driven by mechanical connection 75 at the same rate of speed as reel 53.

As described further in the above-identified application, the impulse response of the time-domain filter may be varied by varying the speed at which the data is presented to the pickup heads. In this manner, the frequency response of the filter is varied to produce the desired results. In such an arrangement, the physical spacing between the various pickup heads is maintained constant as well as the gain of the amplifiers 70–72. Under these conditions, the filter will pass higher frequencies if the tape 58 is driven at a high rate of speed and lower frequencies if the tape is driven at a reduced rate of speed. Such a system is particularly applicable to the present invention where it is desired to vary the frequency response of the filter in direct dependence upon the logging speed. More particularly, by driving the tape 58 at a rate proportional to the logging speed, the cutoff frequency may be varied in direct dependence upon the logging speed to obtain the desired result as described previously.

The arrangement for driving the tape 58 at a rate proportional to a logging speed comprises a pickup head 80 employed for sensing the timing signal 55 and for controlling the speed of the motor 61 which may be a synchronous motor. As described previously, the timing signal 55 is recorded during the logging operations on a tape 50. In recording this signal during logging, the tape 50 is driven at a constant rate of speed. A tachometer generator coupled to the logging cable is employed to produce an A.C. signal having a frequency proportional to the logging speed. Thus, the frequency of the signal 55 recorded is dependent upon the logging speed. During playback, the tape 50 is driven at the same constant rate of speed as driven during logging. The timing signal 55 recorded on tape 50 is detected by the pickup head 80 in the playback system, applied to instrumentation including amplifier 81 and employed to drive the motor 61 at a rate depending upon the frequency of the signal 55. With this arrangement, the output of the motor 61 thus drives the tape 58 at a rate proportional to the logging speed.

Referring now to FIGURE 4, there will be described a modified system and technique for reducing the effect of the micropulsation field. In this embodiment, the micropulsation field is measured independently at the surface by a magnetometer 90 and subtracted from the field measured in the borehole. This magnetometer is similar to the one employed in the borehole tool 12. Subtraction is carried out by a difference circuit 91 coupled to frequency meter 20, and to the surface magnetometer by way of frequency meter 92. Preferably, the embodiment of FIGURE 4 is employed in areas free from substantial surface interference, which may be caused by power lines or moving vehicles. In addition, the embodiment is employed in situations where there is no substantial phase shift in the micropulsation field in traveling from the surface to the deepest point to be measured in the borehole. Normally, substantial phase shift will not occur at depths up to 3,000 feet.

In one embodiment, the magnetometer employed may be a rubidium vapor type magnetometer, model X-4936 and available from Varian Associates, Palo Alto, Calif. Magnetometers of this nature have special applications for borehole logging of formation fields due to their high sensitivity. The sensing head 14 of the magnetometer employed has a length of the order of three inches.

In the borehole logging unit 12 (FIGURE 1), the magnetometer sensing head 14, including a suitable amplifier, is enclosed in a plastic tubing 93. Spaced from a sensing head 14 a distance of about 15–20 feet is a power supply 94 also enclosed in a plastic tube. The housing of the unit 12 is of phenolic resin. At the surface, the signal frequency from conductor 19 is applied to the frequency meter 20 by way of slip ring 95, brush 96, and amplifier 97. Current is applied downhole to the power supply by way of conductor 98, a slip ring and brush (not shown), and cable conductor 99.

In the embodiment of FIGURE 1, the chart of the recorder 25 is driven in correlation with depth and at a rate dependent upon the logging speed by a measuring reel 100 and connection 101 for the production of a continuous trace illustrated at 102. A suitable variable filter 24 is available from the Krohn-Kite Corporation, Cambridge, Mass., model 340–A.

When recording on magnetic tape 50, during logging, for use in the playback system of FIGURE 3, a tachometer generator may be substituted for the measuring reel 100 (FIGURE 1) for the production of the timing signals. During logging, the recorder employed drives, at a constant speed, the magnetic tape which has a plurality of channels for recording the signals of interest and the timing signals. Depth of logging may be determined from the number of cycles of timing signals recorded and a knowledge of the circumference of the tachometer. Suitable multichannel magnetic tapes for use in the present invention are available from Technical Measurement Corporation, North Haven, Conn.

Now that the invention has been described, modifications will become apparent to those skilled in the art and it is intended to cover such modifications as fall within the scope of the appended claim.

What is claimed is:

1. A system for producing a log having variations representative primarily of the variations of the magnetic fields from the formations traversed by a borehole, comprising:

a borehole unit for traversing a borehole, power means for continuously moving said borehole unit through said borehole at a desired velocity, a detector located in said unit for detecting the magnetic field in said borehole and due at least to the formations traversed by said borehole, signal producing means coupled to said detector for continuously producing a signal whose magnitude varies with the depth of said detector in said borehole and is representative of the magnitude of the magnetic field detected in said borehole, adjustable high pass filter means coupled to said signal-producing means for filtering from said signal, in direct dependence upon the velocity at which said borehole unit is moved through said borehole, only signal components having a frequency below a predetermined value to remove the effect of the time-varying micropulsation magnetic field, said predetermined value occurring within the range from zero to about one cycle per second, said filter means passing substantially all signal components having frequencies above said predetermined value for the production of an output signal having variations representative primarily of the variations of the magnetic fields from the formations traversed by said borehole, said filter means having a variable time constant, means coupled to said power means and to said filter means for varying said time constant in direct dependence upon the velocity at which said borehole unit is moved through said borehole, and recording means coupled to said filter means for recording said output signal in correlation with depth.

References Cited

UNITED STATES PATENTS

| | | | |
|---|---|---|---|
| 2,291,692 | 8/1942 | Cloud | 324—8 |
| 2,469,383 | 5/1949 | Gibbs et al. | 250—83.6 |
| 2,879,403 | 3/1959 | Rankin | 250—83.6 |
| 3,321,700 | 5/1967 | Zimmerman | 324—8 |
| 2,441,065 | 5/1948 | Green | 324—8 XR |
| 2,766,426 | 10/1956 | Wilhelm | 324—8 XR |
| 3,274,488 | 9/1966 | Washkurak et al. | 324—8 XR |

RUDOLPH V. ROLINEC, *Primary Examiner.*

G. R. STRECKER, *Assistant Examiner.*